US011792084B1

(12) United States Patent
Foukas et al.

(10) Patent No.: US 11,792,084 B1
(45) Date of Patent: Oct. 17, 2023

(54) INFERENCE WITH INLINE REAL-TIME ML MODELS IN APPLICATIONS

(71) Applicant: Microsoft Technology Licensing, LLC, Redmond, WA (US)

(72) Inventors: Xenofon Foukas, Cambridge (GB); Bozidar Radunovic, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/824,801

(22) Filed: May 25, 2022

(51) Int. Cl.
*H04L 29/08* (2006.01)
*H04L 41/16* (2022.01)
*G06N 3/10* (2006.01)

(52) U.S. Cl.
CPC ............... *H04L 41/16* (2013.01); *G06N 3/10* (2013.01)

(58) Field of Classification Search
CPC ....................................................... H04L 41/16
See application file for complete search history.

(56) References Cited

U.S. PATENT DOCUMENTS

2018/0307984 A1* 10/2018 Koker .................... G06N 20/00
2021/0058424 A1*  2/2021 Chang ................. H04L 63/1425

OTHER PUBLICATIONS

Ziv, et al., "An on-line algorithm for checkpoint placement", in Journal of IEEE Transactions on Computers, vol. 46, Issue 9, Sep. 1997, pp. 976-985.

Foukas, et al., "FlexRAN: A Flexible and Programmable Platform for Software-Defined Radio Access Networks", in Proceedings of the 12th International on Conference on emerging Networking Experiments and Technologies, Dec. 2016, pp. 427-441.
Foukas, et al., "Network Slicing in 5G: Survey and Challenges", in Journal of IEEE Communications Magazine, vol. 55, Issue 5, May 2017, pp. 94-100.
Garcia-Aviles, et al., "Nuberu: Reliable RAN virtualization in shared platforms", in Proceedings of the 27th Annual International Conference on Mobile Computing and Networking, Oct. 2021, pp. 749-761.
Garcia-Saavedra, et al., "ORAN: Disrupting the virtualized RAN ecosystem", in IEEE Communications Standards Magazine, Sep. 2021, 8 Pages.

(Continued)

*Primary Examiner* — Adnan M Mirza
(74) *Attorney, Agent, or Firm* — ArentFox Schiff LLP

(57) ABSTRACT

Described are examples for using codelets executing within applications to use machine-learning (ML) models to infer a result based on application data. The codelets may be dynamically loaded into the applications during execution. A controller verifies, based on extended Berkeley packet filter (eBPF) bytecode of the codelet, that the codelet satisfies safety requirements for execution within the application. A computing device executing the application loads the verified codelet into a library of the application. The application executes the verified codelet to apply application data to the machine-learning model to infer a result. The ML model may be implemented by the eBPF code of the codelet or the codelet may include a call to a machine-learning model of a type supported by a controller of the application and a map for a serial representation of the machine-learning model. The computing device may reconstruct the ML model based on the serial representation.

16 Claims, 9 Drawing Sheets

(56) References Cited

OTHER PUBLICATIONS

Gershuni, et al., "Simple and precise static analysis of untrusted linux kernel extensions", in Proceedings of the 40th ACM SIGPLAN Conference on Programming Language Design and Implementation, Jun. 2019, pp. 1069-1084.
Guo, et al., "Enabling 5G RAN Slicing With EDF Slice Scheduling", in Proceedings of IEEE Transactions on Vehicular Technology, vol. 68, Issue 3, Mar. 2019, pp. 2865-2877.
Haas, et al., "Bringing the web up to speed with webassembly", in Proceedings of the 38th ACM SIGPLAN Conference on Programming Language Design and Implementation, Jun. 2017, pp. 185-200.
Huang, et al., "WebAssembly Micro Runtime", Retrieved from: https://github.com/bytecodealliance/wasm-micro-runtime. May 18, 2022, 11 Pages.
Huynh, et al., "Hidden Linux Metrics with Prometheus eBPF Exporter", Retrieved from: https://www.usenix.org/conference/lisa18/presentation/huynh, Oct. 31, 2018, 4 Pages.
Imtiaz, et al., "Random forests for resource allocation in 5G cloud radio access networks based on position information", In EURASIP Journal on Wireless Communications and Networking, Dec. 2018, 17 Pages.
Johnson, et al., "NexRAN: Closed-loop RAN slicing in POWDER-A top-to-bottom open-source open-RAN use case", in Proceedings of the 15th ACM Workshop on Wireless Network Testbeds, Experimental evaluation & CHaracterization, Jan. 2022, pp. 17-23.
Kotaru, et al., "Spotfi: Decimeter level localization using wifi", in Proceedings of the ACM Conference on Special Interest Group on Data Communication, Aug. 17, 2015, pp. 269-282.
Kulin, et al., "End-to-End Learning From Spectrum Data: A Deep Learning Approach for Wireless Signal Identification in Spectrum Monitoring Applications", in Journal of IEEE Access, vol. 6, Mar. 26, 2018, pp. 18484-18501.
Lehmann, et al., "Everything Old is New Again: Binary Security of WebAssembly", in Proceedings of the 29th USENIX Security Symposium, Aug. 12, 2020, pp. 217-234.
Luo, et al., "Channel State Information Prediction for 5G Wireless Communications: A Deep Learning Approach", in Journal of IEEE Transactions on Network Science and Engineering, vol. 7, Issue 1, Jan. 2020, pp. 227-236.
Maeng, et al., "Adaptive Dynamic Checkpointing for Safe Efficient Intermittent Computing", in Proceedings of the 13th USENIX Symposium on Operating Systems Design and Implementation, Oct. 8, 2018, pp. 129-144.
Maeng, et al.,"Alpaca: Intermittent execution without checkpoints", in Proceedings of the ACM on Programming Languages, vol. 1, Oct. 2017, 30 Pages.
McKenney, et al., "RCU Usage in the Linux Kernel: One Decade Later", in Technical report, Feb. 2013, 15 Pages.
McKenney, et al., "What is RCU, Fundamentally?", in Linux Weekly News, Dec. 2007, 17 Pages.
Mehrabi, et al., "Decision Directed Channel Estimation Based on Deep Neural Network k-Step Predictor for MIMO Communications in 5G", in IEEE Journal on Selected Areas in Communications, vol. 37, Issue 11, Nov. 2019, pp. 2443-2456.
Mohsin, et al., "On Analyzing Beamforming Implementation in O-RAN 5G", in Journal of Electronics, vol. 10, Issue 17, Sep. 4, 2021, 17 Pages.
Monnet, et al., "Awesome eBPF", Retrieved from: https://github.com/zoidbergwill/awesome-ebpf, Apr. 22, 2022, 22 Pages.
Nikaein, et al., "Mosaic5G: Agile and flexible service platforms for 5G research", In ACM SIGCOMM Computer Communication Review, vol. 48, Issue 3, Jul. 2018, pp. 29-34.
Nojima, et al., "Resource isolation in RAN part while utilizing ordinary scheduling algorithm for network slicing", in Proceedings of IEEE 87th Vehicular Technology Conference (VTC Spring), Jun. 3, 2018, 5 Pages.

Paoloni, et al., "How to Benchmark Code Execution Times on Intel® IA-32 and IA-64 Instruction Set Architectures", in White Paper of Intel, Sep. 2010, 37 Pages.
Polese, et al., "Machine Learning at the Edge: A Data-Driven Architecture With Applications to 5G Cellular Networks", in Journal of IEEE Transactions on Mobile Computing, vol. 20, Issue 12, Dec. 1, 2021, pp. 3367-3382.
Ransford, et al., "Mementos: System support for long-running computation on RFID-scale devices", in ACM SIGARCH Computer Architecture News, vol. 39, Issue 1, Mar. 5, 2011, pp. 159-170.
Rost, et al., "Opportunistic Hybrid ARQ—Enabler of Centralized-RAN Over Nonideal Backhaul", in Proceedings of IEEE Wireless Communications Letters, vol. 3(5), Oct. 2014, pp. 481-484.
Roux, Cedric, "T tracer", Retrieved from: https://gitlab.eurecom.fr/oai/openairinterface5g/-/wikis/T, Aug. 14, 2018, 1 Page.
Saija, et al., "A Machine Learning Approach for SNR Prediction in 5G Systems", in Proceedings of IEEE International Conference on Advanced Networks and Telecommunications Systems (ANTS), Dec. 16, 2019, 6 Pages.
Schmidt, et al., "Flexric: an sdk for next-generation sd-rans", in Proceedings of the 17th International Conference on emerging Networking EXperiments and Technologies, Dec. 2021, pp. 411-425.
Sen, et al., "You are facing the Mona Lisa: Spot localization using PHY layer information", in Proceedings of the 10th International conference on Mobile systems, applications and services, Jun. 2012, pp. 183-196.
Skeet, Jon, "protocolbuffers / protobuf", Retrieved from: https://github.com/protocolbuffers/protobuf/blob/fb77cc9d9f066a8ce4f12e8d5f76188d48101444/benchmarks/google_size.proto, Jun. 26, 2015, 5 Pages.
Strodthoff, et al., "Enhanced machine learning techniques for early HARQ feedback prediction in 5G", in IEEE Journal on Selected Areas in Communications, vol. 37, Issue 11, Nov. 2019, pp. 2573-2587.
Vieira, et al., "Fast packet processing with ebpf and xdp: Concepts, code, challenges, and applications", in ACM Computing Surveys, vol. 53, No. 1, Feb. 2020, 36 Pages.
Wilhelm, et al., "The worst-case execution-time problem—overview of methods and survey of tools", in Proceedings of ACM Transactions on Embedded Computing Systems (TECS), vol. 7, Issue 3, Apr. 2008, 53 Pages.
Wolf, et al., "Fault Coverage of a Timing and Control Flow Checker for Hard Real-Time Systems", in Proceedings of IEEE 18th International On-Line Testing Symposium (IOLTS), Jun. 27, 2012, pp. 127-129.
Wolf, et al., "Fine-grained timing and control flow error checking for hard real-time task execution", in Proceedings of 7th IEEE International Symposium on Industrial Embedded Systems (SIES'12), Jun. 20, 2012, pp. 257-266.
Yin, et al., "Predicting Channel Quality Indicators for 5G Downlink Scheduling in a Deep Learning Approach", in Repository of arXiv:2008.01000v1, Aug. 3, 2020, 6 Pages.
Zhang, et al., "Energy-Aware Adaptive Checkpointing in Embedded Real-Time Systems", in Proceedings of Design, Automation and Test in Europe Conference and Exhibition, Mar. 7, 2003, 6 Pages.
Zhang, Qi, "Predicting buffer status report (bsr) for 6g scheduling using machine learning models", in KTH Thesis Report, 2021, 64 Pages.
Zheng, et al., "A modified arima model for cqi prediction in lte-based mobile satellite communications", in Proceedings of IEEE International Conference on Information Science and Technology, Mar. 23, 2012, pp. 822-826.
Polese, et al., "Understanding O-RAN: Architecture, Interfaces, Algorithms, Security, and Research Challenges", in Repository of arXiv:2202.01032v1, Feb. 2, 2022, 23 Pages.
"Technical Specification Group Services and System Aspects; Telecommunication management; Performance Management (PM); Performance measurements Evolved Universal Terrestrial Radio Access Network", Retrieved from: https://portal.3gpp.org/desktopmodules/Specifications/SpecificationDetails.aspx?specificationId=2011, Dec. 2020, 117 Pages.

(56) References Cited

OTHER PUBLICATIONS

"5G FAPI: PHY API specification", Retrieved from: https://www.smallcellforum.org/reports/5g-fapi-phy-api-specification/, Nov. 10, 2021, 2 Pages.

"5G FAPI: PHY API Specification", Retrieved from: http://scf.io/en/documents/222_5G_FAPI_PHY, Nov. 2021, 234 Pages.

"An Assessment of the Effects of Repeaters on Mobile Networks", Retrieved from: https://www.ofcom.org.uk/__data/assets/pdf_file/0017/85004/eeffects_of_repeaters_on_mobile_networks.pdf, Nov. 9, 2015, 57 Pages.

"Cellwize Announces Collaboration to Accelerate Deployment of 5G vRAN Networks With AI", Retrieved from: https://www.sdxcentral.com/articles/press-release/cellwize-announces-collaboration-to-accelerate-deployment-of-5g-vran-networks-with-ai/2021/06/, Jun. 22, 2021, 5 Pages.

"E1 Application Protocol (E1AP)", Retrieved from: https://www.etsi.org/deliver/etsi_ts/138400_138499/138463/15.00.00_60/ts_138463v150000p.pdf, Jul. 2018, 129 Pages.

"eBPF", Retrieved from: https://web.archive.org/web/20220516005958/https://ebpf.io/, May 16, 2022, 6 Pages.

"EBPF-based Networking, Observability, Security", Retrieved from: https://web.archive.org/web/20220517081022/https://cilium.io/, May 17, 2022, 13 Pages.

"Efficient interference hunting", Retrieved from: https://www.rohde-schwarz.com/uk/solutions/aerospace-defense-security/security/spectrum-monitoring/efficient-interference-hunting/huntinginterferences_91389.html, Retrieved Date: Apr. 12, 2022, 11 Pages.

"F1 general aspects and principles", Retrieved from: https://www.etsi.org/deliver/etsi_ts/138400_138499/138470/15.04.00_60/ts_138470v150400p.pdf, Apr. 2019, 14 Pages.

"FlexRAN™ Reference Architecture for Wireless Access", Retrieved from: https://web.archive.org/web/20220225191047/https://www.intel.com/content/www/us/en/developer/topic-technology/edge-5g/tools/flexran.html, Feb. 25, 2022, 8 Pages.

"Intelligent 5G L2 MAC Scheduler", in White Paper of Intel, Feb. 2021, 17 Pages.

"Management and orchestration; 5G performance measurements", Retrieved from: https://www.etsi.org/deliver/etsi_ts/128500_128599/128552/16.06.00_60/ts_128552v160600p.pdf, Aug. 2020, 196 Pages.

"Monitoring & Metrics", Retrieved from: https://web.archive.org/web/20210306081428/https://docs.cilium.io/en/stable/operations/metrics/, Mar. 6, 2021, 16 Pages.

"NG general aspects and principles", Retrieved from: https://www.etsi.org/deliver/etsi_ts/138400_138499/138410/15.00.00_60/ts_138410v150000p.pdf, Jul. 2018, 14 Pages.

"OAI Layer 2 Protocol Stack", Retrieved from: https://www.openairinterface.org/docs/workshop/1stOAINorthAmericaWorkshop/Training/KNOPP-OAI-L2.pdf, Nov. 12, 2018, 37 Pages.

"OpenAirInterface Software Alliance", Retrieved from: https://web.archive.org/web/20220503230132/https://openairinterface.org/about-us/, May 3, 2022, 3 Pages.

"O-RAN Use Cases and Deployment Scenarios", in White Paper of ORAN Alliance, Feb. 2020, 21 Pages.

"Radio Link Control (RLC) protocol specification", Retrieved from: https//www.etsi.org/deliver/etsi_ts/138300_138399/138322/16.01.00_60/ts_138322v160100p.pdf, Jul. 2020, 36 Pages.

"Radio Resource Control (RRC); Protocol specification", Retrieved from: https://www.etsi.org/deliver/etsi_ts/138300_138399/138331/16.01.00_60/ts_138331v160100p.pdf, Jul. 2020, 886 Pages.

"RAN Intelligent Controller Applications (RICAPP)", Retrieved from: https://web.archive.org/web/20220516043047/https://docs.o-ran-sc.org/en/latest/projects.html, May 16, 2022, 6 Pages.

"Smart Edge Open Radio Access Network", Retrieved from: https://smart-edge-open.github.io/ido-specs/doc/reference-archrtectures/ran/smartedge-open_ran/, Retrieved Date: Apr. 12, 2022, 21 Pages.

"Telefonica views on the design, architecture, and technology of 4G/5G Open RAN networks", in White Paper of Telefonica, Jan. 2021, 15 Pages.

"The LLVM Compiler Infrastructure", Retrieved from: https://llvm.org/, Mar. 25, 2022, 3 Pages.

"UBPF", Retrieved from: https://github.com/iovisor/ubpf, May 19, 2022, 4 Pages.

"Unleash the Speed of 4G and 5G Virtualized Radio Access Networks (vRAN)", in Intel® vRAN Dedicated Accelerator ACC100, May 6, 2022, 2 Pages.

"Userspace RCU", Retrieved from: https://web.archive.org/web/20220516131857/https://liburcu.org/, May 16, 2022, 10 Pages.

"Virtual RAN (vRAN) with Hardware Acceleration", in White Paper of Intel, Jan. 2020, 2 Pages.

"Wireless breakthrough for the Ocado Smart Platform", Retrieved from: https://web.archive.org/web/20220411234306/https://www.cambridgeconsultants.com/case-studies/wireless-breakthrough-ocado-smart-platform, Apr. 11, 2022, 26 Pages.

"Wireless Frameworks", Retrieved from: https://web.archive.org/web/20210420192514/https://capgemini-engineering.com/nl/en/services/next-core/wireless-frameworks/, Apr. 20, 2021, 17 Pages.

"With Vodafone and Partners, Vmware Demonstrates How to Accelerate Innovation in the RAN", Retrieved from: https://www.cohere-tech.com/press-releases/with-vodafone-and-partners-vmware-demonstrates-how-to-accelerate-innovation-in-the-ran, Retrieved Date: Apr. 12, 2022, 7 Pages.

"Xn general aspects and principles", Retrieved from: https://www.etsi.org/deliver/etsi_ts/138400_138499/138420/16.00.00_60/ts_138420v160000p.pdf, Jul. 2020, 18 Pages.

Aimonen, et al., "Nanopb—Protocol Buffers for Embedded Systems", Retrieved from: https://github.com/nanopb/nanopb, Apr. 23, 2022, 6 Pages.

Akhtar, et al., "Machine Learning based Prediction of PMI Report for DL-Precoding in 5G-NR System", in IEEE 4th 5G World Forum (5GWF), Oct. 13, 2021, pp. 105-110.

Akman, et al., "O-RAN Minimum Viable Plan and Acceleration towards Commercialization", in White Paper of O-RAN Alliance, Jun. 29, 2021, 26 Pages.

Babrou, et al., "ebpf_exporter", Retrieved from: https://github.com/cloudflare/ebpf_exporter, Oct. 19, 2021, 31 Pages.

Babrou, Ivan, "Introducing ebpf_exporter", Retrieved from: https://blog.cloudflare.com/introducing-ebpf_exporter/, Aug. 24, 2018, 33 Pages.

Balasub Raman Ian, et al., "RIC: A RAN Intelligent Controller Platform for AI-Enabled Cellular Networks", in Journal of IEEE Internet Computing, vol. 25, Issue 2, Mar. 2021, pp. 7-17.

Balieiro, et al., "A Machine Learning Approach for CQI Feedback Delay in 5G and Beyond 5G Networks", in Proceedings of 30th Wireless and Optical Communications Conference (WOCC), Oct. 7, 2021, 5 Pages.

Bendersky, et al., "pyelftools", Retrieved from: https://github.com/eliben/pyelftools, Feb. 3, 2022, 3 Pages.

Berardinelli, et al., "Enabling early HARQ feedback in 5G networks", in Proceedings of IEEE 83rd Vehicular Technology Conference (VTC Spring), May 15, 2016, 5 Pages.

Bolton, Mark, "The trouble with illegal mobile repeaters", Retrieved from: https://exchange.telstra.com.au/illegal-mobile-repeaters/, Apr. 13, 2018, 5 Pages.

Bonati, et al., "Intelligence and learning in O-RAN for data-driven NextG cellular networks", in Journal of IEEE Communications Magazine, vol. 59, Issue 10, Oct. 2021, pp. 21-27.

Bonati, et al., "SCOPE: an open and softwarized prototyping platform for NextG systems", in Proceedings of the 19th Annual International Conference on Mobile Systems, Applications and Services, Jun. 2021, pp. 415-426.

Brown, Gabriel, "New Transport Network Architectures for 5G RAN", in White Paper of Heavy Reading, 2018, 11 Pages.

Bui, et al., "Data-Driven Evaluation of Anticipatory Networking in LTE Networks", in Proceedings of 29th International Teletraffic Congress (ITC 29), Sep. 4, 2017, pp. 46-54.

Cazorla, et al., "Probabilistic worst-case timing analysis: Taxonomy and comprehensive survey", in ACM Computing Surveys, vol. 52, Issue 1, Feb. 2019, pp. 1-35.

Defosseux, Raphael, "OpenAirKernelMainSetup", Retrieved from: https://gitlab.eurecom.fr/oai/openairinterface5g/-/wikis/OpenAirKernelMainSetup, Apr. 16, 2019, 5 Pages.

(56) References Cited

OTHER PUBLICATIONS

Elayoubi, et al., "5G RAN Slicing for Verticals: Enablers and Challenges", in Proceedings of IEEE Communications Magazine, vol. 57, Issue 1, Jan. 2019, pp. 28-34.
Foukas, et al., "Concordia: teaching the 5G vRAN to share compute", in Proceedings of the ACM SIGCOMM Conference, Aug. 2021, pp. 580-596.
"Berkeley Packet Filter", Retrieved from: https://en.wikipedia.org/w/index.php?title=Berkeley_packet_Filter&oldid=1085234166, Apr. 29, 2022, 5 Pages.
Bachl, et al., "A Flow-based IDS using Machine Learning in eBPF", In Repository of arXiv:2102.09980v1, Feb. 19, 2021, 2 Pages.
Corbet, Jonathan, "Extending extended BPF", Retrieved From: https://lwn.net/Articles/603983/, Jul. 2, 2014, 4 Pages.
Flynn, Christopher, "Machine Learning Model Serialization", Retrieved from: https://flynn.gg/blog/machine-learning-model-serialization/, Jan. 4, 2020, 9 Pages.
Liang, et al., "Container Network Performance Anomaly Detection Based on Extended Berkeley Packet Filter and Machine Learning", In Proceedings of International Conference on Natural Computation, Fuzzy Systems and Knowledge Discovery, Jan. 4, 2022, pp. 1403-1415.
"International Search Report and Written Opinion Issued in PCT Application No. PCT/US23/019712", dated Jul. 25, 2023, 12 Pages.

\* cited by examiner

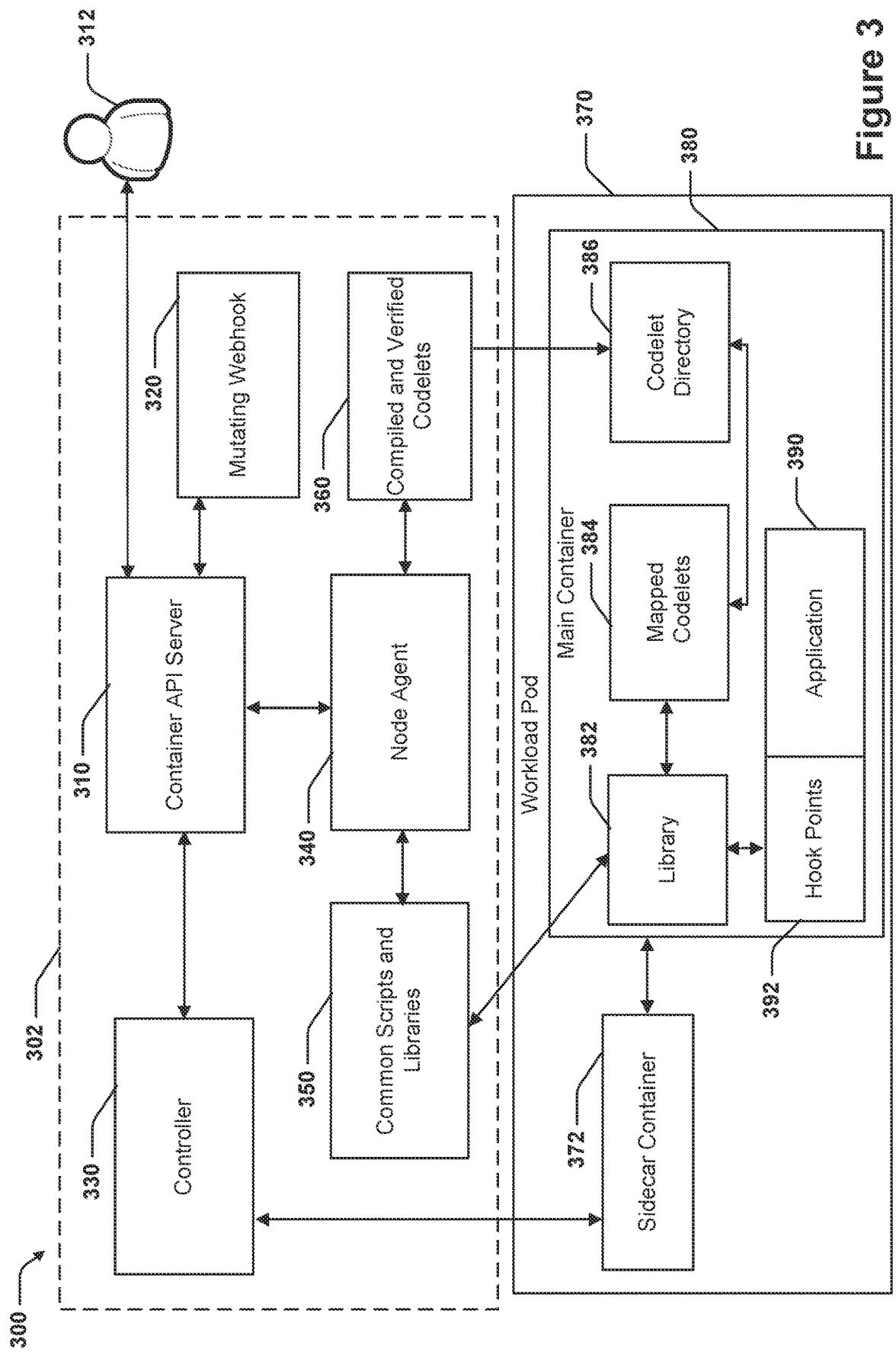

400 ⟶

```
1   #include "janus_defs.h"
2   #include "ubpf_helper.h"
3   #include "output_msg.pb.h"
4   #include #nfapi_interface.h"              ⟵ 410
5
6   struct janus_load_map_def SEC("maps") countermap = {
7     .type = JANUS_MAP_TYPE_ARRAY,
8     .key_size = sizeof(uint32_t),
9     .value_size = sizeof(uint32_t),
10    .max_entries = 1,
11  };
12
13  struct janus_load_map_def SEC("maps") outmap = {
14    .type = JANUS_MAP_TYPE_RINGBUF,
15    .max_entries = 1024,
16    .proto_msg_name = "output_msg",
17    .proto_name = "output_msg",
18    .proto_hash = "PROTO_OUTPUT_MSG_HASH,
19  };
20
21  SEC("janus_ran_fapi")
22  uint64_t bpf_prog(void *state) {
23    void *c;
24    uint32_t index = 0, counter;
25    nfapi_dl_config_request_pdu_t *p, *pend;
26    output_msg s;
27
28    struct janus_ran_fapi_ctx *ctx =
29      (struct janus_ran_fapi_ctx *)state;
30
31    p = (nfapi_dl_config_request_pdu_t *)ctx->data;
32    pend = (nfapi_dl_config_request_pdu_t *)ctx->data_end;
33
34    if (p + 1 > pend) return 1;
35
36    if (p->ndlsch_pdu > 0) {
37      c = janus_map_lookup_elem(&countermap, &index);
38      if (!c) return 1;
39      counter = (*(int *)c + p->ndlsch_pdu);
40      if (counter == 1000) {
41        s.counter = counter;
42        janus_ringbuf_output(&outmap, &s, sizeof(s));
43        counter = 0
44      }
45      janus_map_update_elem(&countermap, &index, &counter);
46    }
47    return 0;
48  }
```

FIG. 4

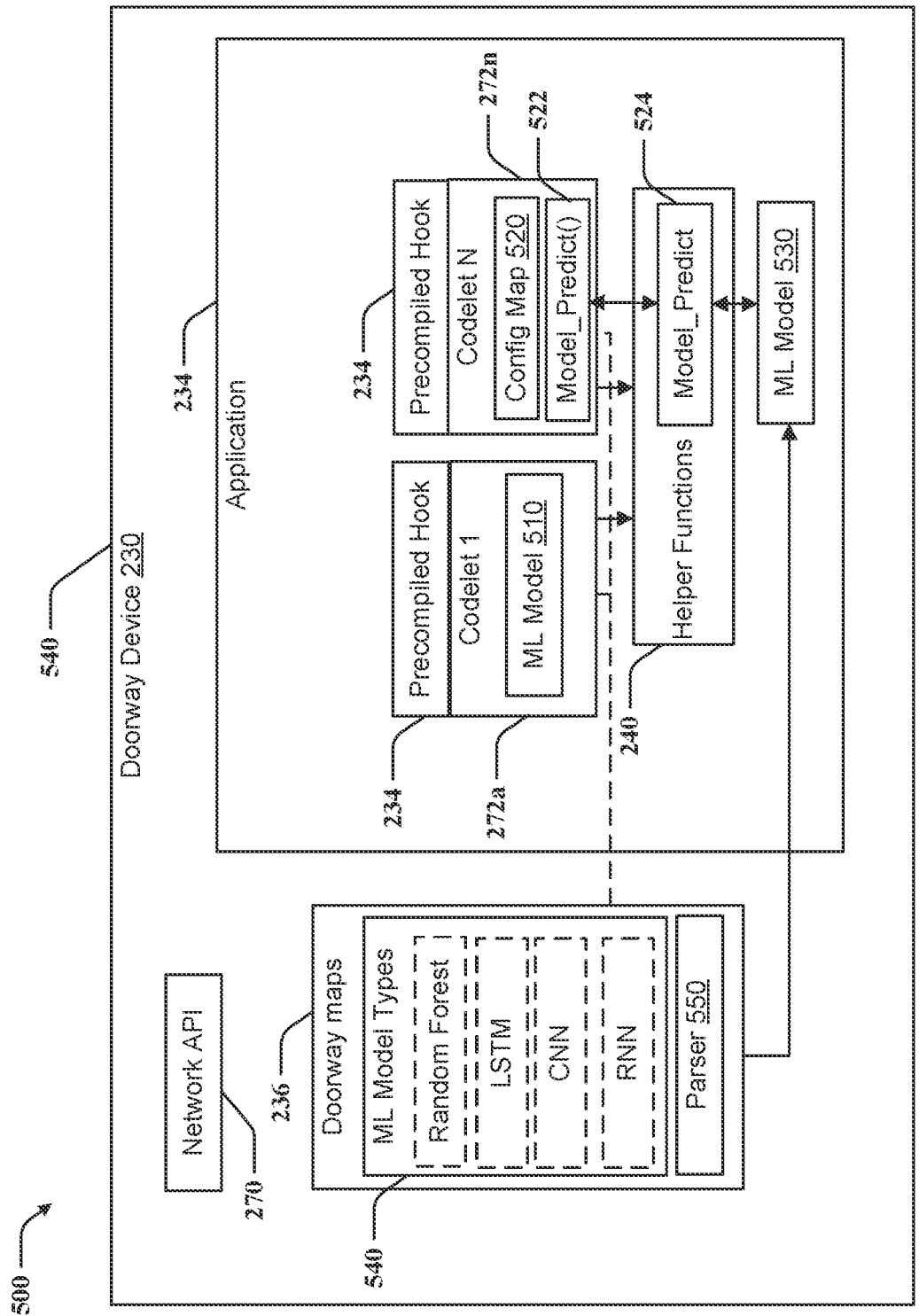

INFERENCE WITH INLINE REAL-TIME ML MODELS IN APPLICATIONS

BACKGROUND

A radio access network (RAN) may provide multiple user devices with wireless access to a network. The user devices may wirelessly communicate with a base station, which forwards the communications towards a core network. Conventionally, a base station in the RAN is implemented by dedicated processing hardware (e.g., an embedded system) located close to a radio unit including antennas. The base station may perform lower layer processing including physical (PHY) layer and media access control (MAC) layer processing for one or more cells. There may be costs associated with deploying dedicated processing hardware for each base station in a RAN, particularly for a RAN including small cells with relatively small coverage areas. Additionally, the dedicated processing hardware may be a single point of failure for the cell.

A virtualized radio access network may utilize an edge data center with generic computing resources for performing RAN processing for one or more cells. That is, instead of performing PHY and MAC layer processing locally on dedicated hardware, a virtualized radio access network may forward radio signals from the radio units to the edge data center for processing and similarly forward signals from the edge data center to the radio units for wireless transmission. In one specific example, cloud-computing environments can be used to provide mobile edge computing (MEC) where certain functions of a mobile network can be provided as workloads on nodes in the cloud-computing environment. In MEC, a centralized unit (CU) can be implemented in a back-end node, one or more distributed units (DUs) can be implemented in intermediate nodes, and various remote units (RU), which can provide at least PHY and/or MAC layers of a base station or other RAN node of the mobile network, can be deployed at edge servers. The RUs can communicate with the CU via one or more DUs. In an example, the DUs can provide higher network layer functionality for the RAN, such as radio link control (RLC) or packet data convergence protocol (PDCP) layer functions. The RUs can facilitate access to the CU for various downstream devices, such as user equipment (UE), Internet-of-Things (IoT) devices, etc.

Because the edge data center utilizes generic computing resources, a virtualized RAN may provide scalability and fault tolerance for base station processing. For example, the edge data center may assign a variable number of computing resources (e.g., servers) to perform PHY layer processing for the radio units associated with the edge data center based on a workload. Further, a virtualized RAN may implement multiple layers of RAN processing at a data center, enabling collection of multiple data feeds.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In some aspects, the techniques described herein relate to a method of executing a machine-learning model within an application, including: verifying, based on extended Berkeley packet filter (eBPF) bytecode of a codelet, that the codelet satisfies safety requirements for execution within the application; loading the verified codelet into a hook point of the application; and executing the verified codelet to apply application data to the machine-learning model to infer a result.

In some aspects, the techniques described herein relate to a method, wherein the codelet includes code implementing a pre-trained machine-learning model.

In some aspects, the techniques described herein relate to a method, wherein the codelet includes a call to a machine-learning model of a type corresponding to one of a plurality of machine-learning model types supported by a controller of the application and a map for a serial representation of the machine-learning model.

In some aspects, the techniques described herein relate to a method, wherein loading the verified codelet includes determining that the serial representation of the machine-learning model is parseable according to the type.

In some aspects, the techniques described herein relate to a method, wherein the plurality of machine-learning model types supported by the controller includes two or more of: a random forest model, a long short-term memory (LSTM) model, a convolutional neural network (CNN), or a recurrent neural network (RNN) model.

In some aspects, the techniques described herein relate to a method, wherein loading the verified codelet includes reconstructing the machine-learning model within memory allocated to the application based on the serial representation of the machine-learning model.

In some aspects, the techniques described herein relate to a method, wherein the call to the machine-learning model includes the map for the serial representation and a data structure including the application data as input parameters and returns the result.

In some aspects, the techniques described herein relate to a method, further including, by the codelet, storing the result for access outside of the application.

In some aspects, the techniques described herein relate to a method, further including, by the application, making a decision based on the result.

In some aspects, the techniques described herein relate to a method, wherein the application is a virtualized radio access network (vRAN) function.

In some aspects, the techniques described herein relate to an apparatus for executing a machine-learning model within an application, including: a memory storing computer-executable instructions; and at least one processor configured to execute the instructions to: receive compiled and verified codelet, wherein extended Berkeley packet filter (eBPF) bytecode of the codelet has been verified to satisfy safety requirements for execution within the application; load the verified codelet into a hook point of the application; and execute the verified codelet to apply application data to the machine-learning model to infer a result.

In some aspects, the techniques described herein relate to an apparatus, wherein the codelet includes code implementing a pre-trained machine-learning model.

In some aspects, the techniques described herein relate to an apparatus, wherein the codelet includes a call to a machine-learning model of a type corresponding to one of a plurality of machine-learning model types supported by a controller of the application and a map for a serial representation of the machine-learning model.

In some aspects, the techniques described herein relate to an apparatus, wherein the at least one processor is configured to determine that the serial representation of the machine-learning model is parseable according to the type.

In some aspects, the techniques described herein relate to an apparatus, wherein the plurality of machine-learning model types supported by the controller includes two or more of: a random forest model, a long short-term memory (LSTM) model, a convolutional neural network (CNN), or a recurrent neural network (RNN) model.

In some aspects, the techniques described herein relate to an apparatus, wherein the at least one processor is configured to reconstruct the machine-learning model within memory allocated to the application based on the serial representation of the machine-learning model.

In some aspects, the techniques described herein relate to an apparatus, wherein the call to the machine-learning model includes the map for the serial representation and a data structure including the application data as input parameters and returns the result.

In some aspects, the techniques described herein relate to an apparatus, wherein the at least one processor executing the codelet is configured to store the result in an output schema map for access outside of the application.

In some aspects, the techniques described herein relate to an apparatus, wherein the processor executing the application is configured to make a decision based on the result.

In some aspects, the techniques described herein relate to an apparatus, wherein the application is a virtualized radio access network (vRAN) function.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 3 illustrates an example architecture for loading codelets in a container orchestration system.

FIG. 4 is an example code listing for a codelet that may be executed in a vRAN using the example doorway system.

FIG. 5 is a diagram showing execution of machine-learning models within an application using codelets.

DETAILED DESCRIPTION

Figure 1:
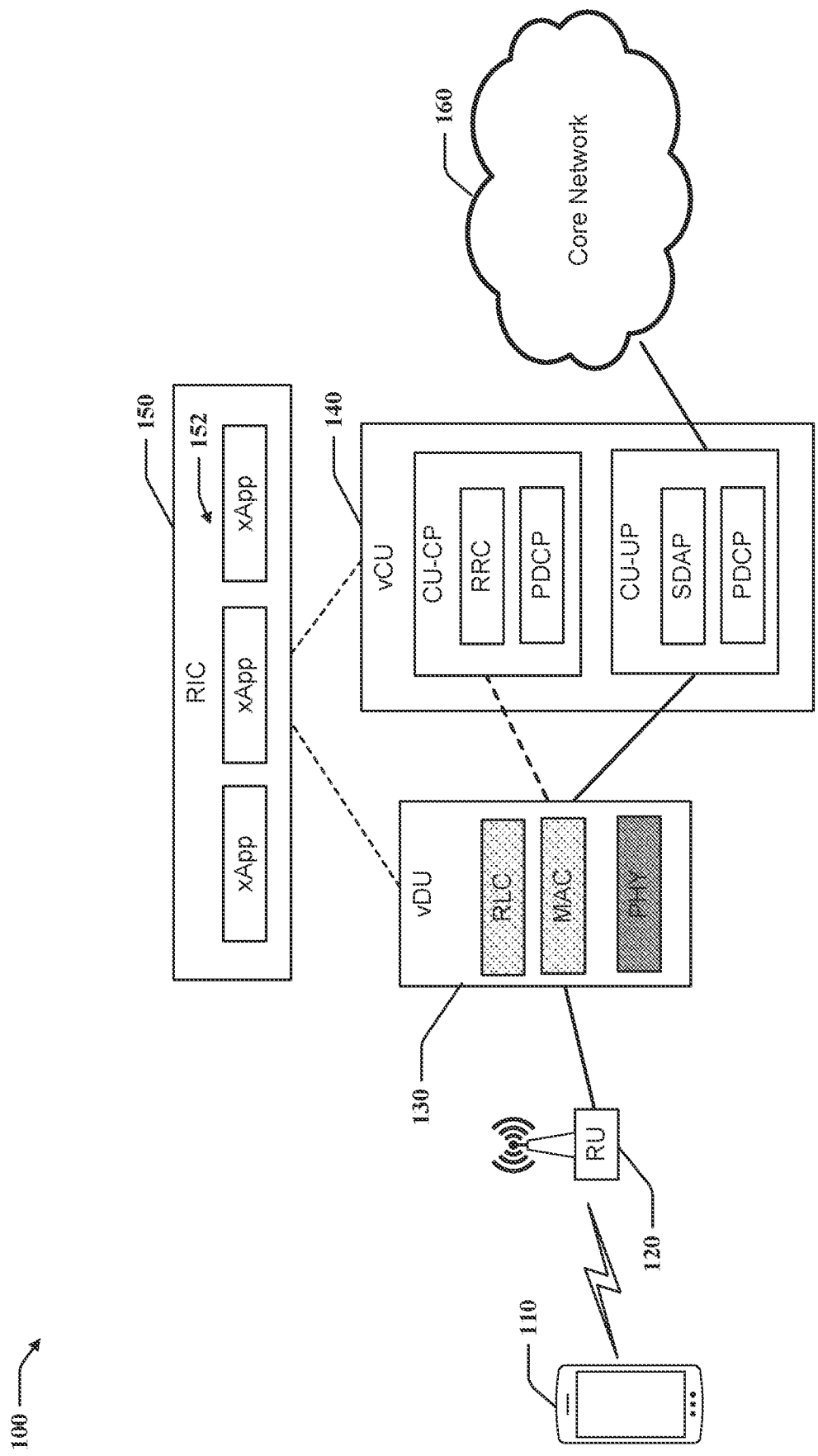
FIG. 1 is a diagram of an example virtualized radio access network (vRAN) connecting a user equipment (UE) to a core network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known components are shown in block diagram form in order to avoid obscuring such concepts.

This disclosure describes various examples related to using codelets for analytics and control. In particular, the codelets may be limited to a runtime threshold that may be set at a microsecond level to provide fine-grained, real-time, preemption of the codelet. For example, such preemption may be useful in a real-time environment such as a virtualized radio access network (vRAN) with tight timing controls for network functions.

A key transformation of the Radio Access Network (RAN) in 5G is the migration to an Open RAN architecture, that sees the 5G RAN virtualized and disaggregated across multiple open interfaces. This approach fosters innovation by allowing multiple vendors to come up with unique solutions for different components at a faster pace. Furthermore, a new component introduced in the Open RAN architecture called a Radio Intelligent Controller (RIC) allows third parties to build new, vendor-agnostic monitoring and optimization use cases over interfaces standardized by O-RAN.

Despite this compelling vision, the opportunity for innovation still largely remains untapped because of two main challenges. The first challenge is related to the flexible data collection for monitoring and telemetry applications. The RAN functions can generate huge volumes of telemetry data at a high frequency (e.g., gigabytes per second). Collecting, transferring, and processing this data can put a strain on compute and network capacity. A conventional approach, standardized by the $3^{rd}$ generation partnership project (3GPP), defines a small set of aggregate cell key performance indicators (KPIs) collected every few seconds or minutes. The O-RAN RIC extends this idea by providing new KPIs at a finer time granularity. Each KPI is defined through a service model (a form of API), most of them standardized by O-RAN. However, this approach is slow to evolve and does not scale well because of a limited number of initial use cases and a need to standardize new proposals. The second challenge is due to the real-time nature of many RAN control and data plane operations. Any new functionality added to these operations, in order to support a new service model, must be completed within a deadline, typically ranging from nanoseconds (µs)) to a few milliseconds (ms). A deadline violation may cause performance degradation or even crash a vRAN. Any changes on these critical paths can create substantial design challenges and make RAN vendors reluctant to add new features.

In an aspect, the present disclosure describes a system that provides dynamic monitoring and control of vRAN functionality through a provably safe execution environment. The system may provide access and security for the execution environment and may be referred to as a doorway system. The system extends the RIC concept by allowing vRAN operators to write their own monitoring and control code without any assistance from vendors. The monitoring and control code referred to as codelets can be deployed at runtime at different vRAN components without disrupting the vRAN operation. The codelets are typically executed inline and on vRAN critical paths, thus the codelets can get direct access to all important internal vRAN data structures and can collect arbitrary statistics. Existing and new O-RAN service models can be implemented as codelets, and codelets can be used to implement fast control operations such as radio resource allocation. The codelet model may be extended to other computing environments. For example, codelets may be useful in industrial automation or robotics control where tight timing requirements are also present. In an aspect, codelets may be deployed into an application for performing a workload via a container orchestration system that loads codelets into the container and symbolically links the codelets to hook points within the application.

In order to provide the above functionality, the system is designed with a particular focus on safety, efficiency, and flexibility. The system makes use of extended Berkeley packet filter (eBPF) technology, which solves a similar problem in the Linux kernel. The Linux community has observed that pre-defined kernel APIs limit its observability and controllability. To that end, eBPF is developed as a sandboxed execution environment, in which a system operator can deploy custom code that can access and modify selected kernel structures. Prior to loading a codelet, the eBPF execution environment statically verifies it and only allows safe codelets to run. eBPF has created a proliferation of novel applications at various levels of the Linux kernel.

The doorway system strives to achieve a similar goal in the RAN space and other environments. The doorway system builds on a user space implementation of eBPF, called user-space Berkeley packet filter (uBPF), while leveraging existing tools of the eBPF toolchain such as a compiler and verifier. At a high level, the doorway system runs codelets inside a uBPF virtual environment inlined in a control and data path of a deployed system (e.g., a vRAN). Two principal sets of challenges are unique for the vRAN.

The first set of challenge is about flexibility. It is unclear how much and which RAN monitoring or control data is required to build useful applications. The system focuses on key locations, interfaces, and abstractions within the standard vRAN architecture that provide rich and diverse data from only a few collection points. The system includes a toolchain that allows developers to define arbitrary output data structures that are shipped to the RIC. These data structures are in contrast to the existing Linux output data models that are constrained to specific formats. The doorway system may provide a variety of applications. For example, four classes of applications have been implemented and tested: flexible statistics collection, interference detection, network slicing scheduler, and real-time ML prediction. These classes include 17 applications that add flexibility to the vRAN. These applications (apart from the ones defined in RIC data models) cannot be deployed using the standard O-RAN RIC.

The second set of challenges is about safety. Hard, microsecond (µs)-level execution latency requirements are usually not imposed within the Linux kernel but are important for vRAN operation. In an aspect, the system includes an eBPF patching mechanism that preempts a codelet that exceeds a certain runtime threshold. Furthermore, the doorway system includes a number of features to ensure a lockless and non-preemptable design in the fast path (where the codelets run), minimizing the impact of the system to the performance of the vRAN. The system may also include static verification to cover the newly introduced flexible output data structures.

In an aspect, to execute ML models within an application, an ML model is included within a codelet as either code, or a call to a supported helper function. A verifier may verify that the extended Berkeley packet filter (eBPF) bytecode of the codelet satisfies safety requirements for execution within the application. For relatively simple ML models, the codelet may include a pre-trained model, and the verifier may verify that the codelet including the ML model satisfies the safety requirements. For more complicated ML models, the codelet may include a call to a helper function to infer or predict based on a machine learning model of a type supported by the system. For example, the system may define multiple types of supported ML models based on commonly used model types. The verification of such supported ML models may be performed offline by the trusted system. The codelet may define a specific ML model by including a map for a serial representation of the ML model and a call to the helper function. The system may reconstruct the specific ML model according to the supported type based on the map. The codelet may be verified because the codelet includes a call to a supported helper function. The system may load the verified codelet into a hook point of the application. The system may execute the verified codelet to apply application data to the ML model to infer a result.

In another aspect, the disclosure provides a system for injection of codelets into running applications on a cluster of a container orchestration system. The codelets may provide additional capabilities such as telemetry collection, configuration, or control. The system includes an application programming interface (API) server configured to receive a user configuration of a container image for the application. The user configuration includes a header indicating dynamic loading of codelets. The API service is configured to receive a config map for a codelet while the application is executing in a main container. The system includes a mutating webhook configured to modify the user configuration in response to the header. The mutating webhook may, for example, add a sidecar container to run alongside the main container for the container image, mount one or more libraries into the main container, where the one or more libraries define functions associated with hook points within the application, modify an entry point for the main container to run a script that loads the one or more libraries, or mount a directory for compiled and verified codelets into the main container. The system includes a node agent configured to monitor the API server for the config map, compile and verify the codelet, and place the codelet in the directory. The system includes a controller configured to receive annotations to the user configuration via the API server. The sidecar container is configured to symbolically link the codelet to a hook point within the application based on the annotation.

In an aspect, loading a codelet that includes an ML model into an application allows customization of the application at runtime. For example, the ML model can be updated based on recent training or a current scenario. Additionally, executing a codelet with an ML model within a vRAN application allows customization of vRAN application (e.g., by a network operator) without reliance on standardization or vendor specific solutions. In some implementations, the use of a helper function to call a supported type of ML model in application memory allows complex ML models that cannot be verified independently to be dynamically loaded into an application. Maps defining output schemas that are writable by a codelet allow a codelet executing in a sandboxed environment of an application to export data without risking safety of the application. Accordingly, the present disclosure provides various improvements to the functioning of a computer system such as a vRAN.

Figure 7:
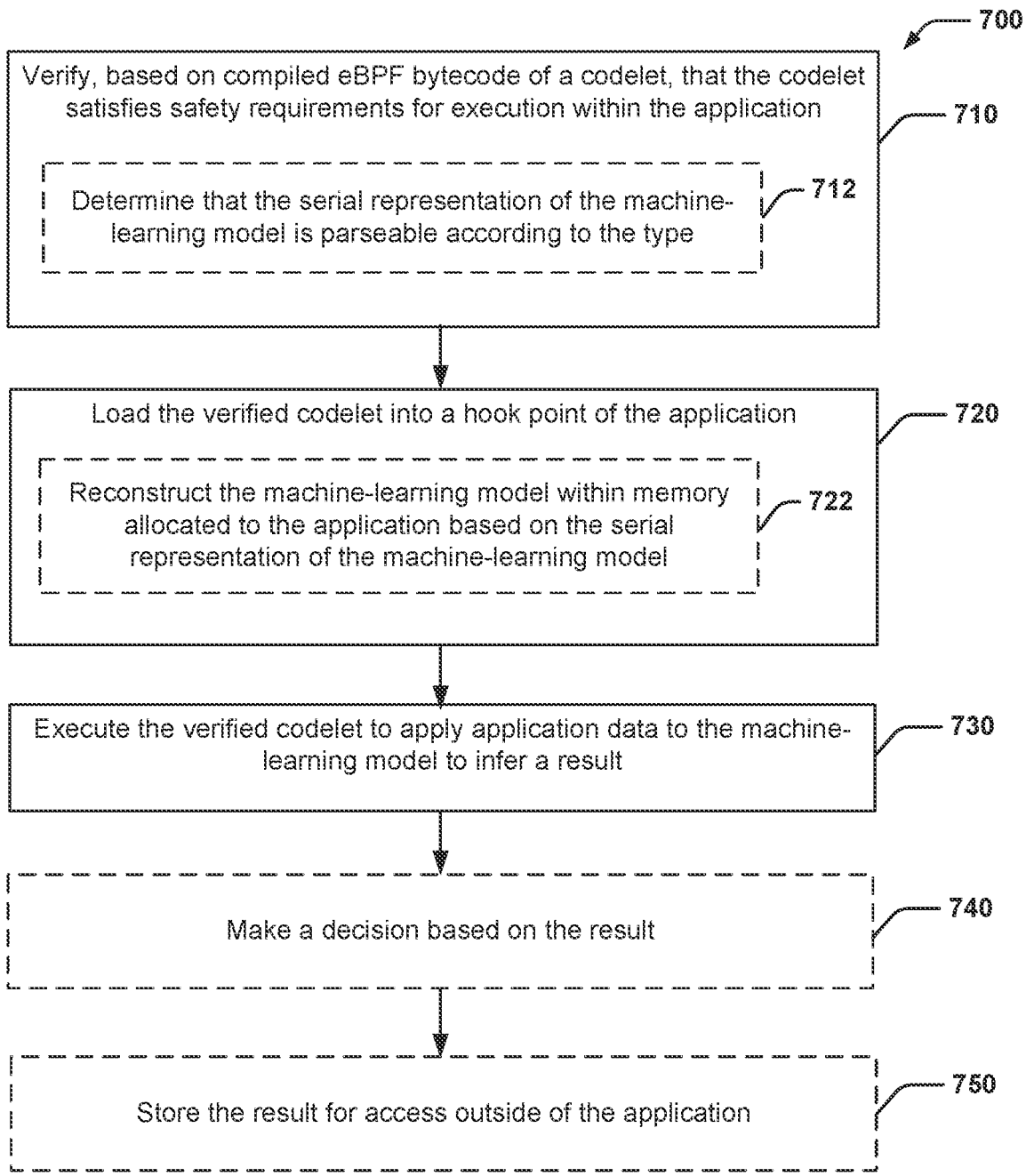
FIG. 7 is a flow diagram of an example of a method for executing codelets including machine-learning models within an application.
Figure 8:
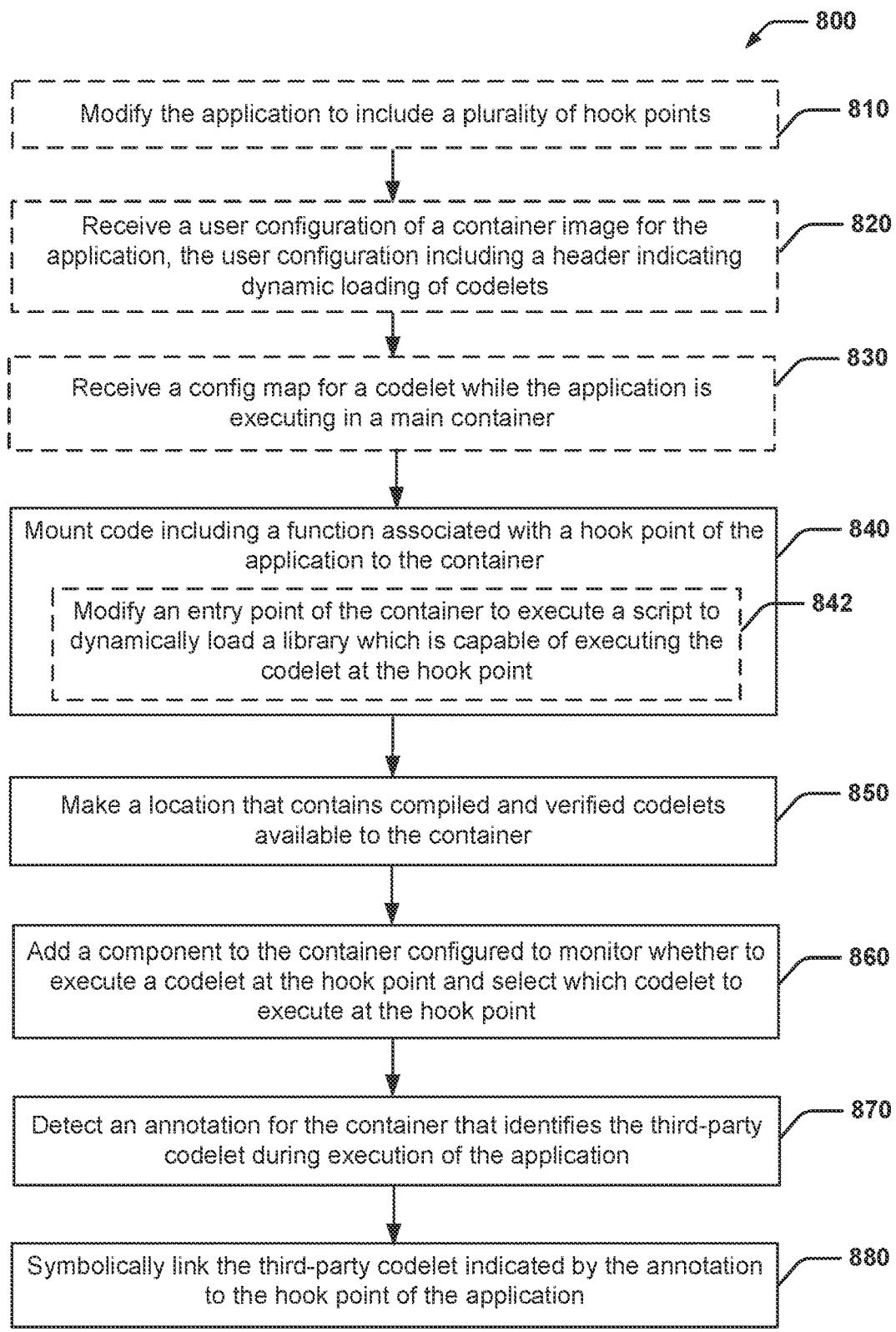
FIG. 8 is a flow diagram of an example of a method for loading codelets into an application executing in a container.

Turning now to FIGS. 1-6, examples are depicted with reference to one or more components and one or more methods that may perform the actions or operations described herein, where components and/or actions/operations in dashed line may be optional. Although the operations described below in FIGS. 7 and 8 are presented in a particular order and/or as being performed by an example component, the ordering of the actions and the components performing the actions may be varied, in some examples, depending on the implementation. Moreover, in some examples, one or more of the actions, functions, and/or described components may be performed by a specially-programmed processor, a processor executing specially-programmed software or computer-readable media, or by any other combination of a hardware component and a software component capable of performing the described actions or functions.

FIG. 1 is a diagram of an example vRAN 100 connecting a user equipment (UE) 110 to a core network 160. The vRAN 100 may include radio units 120 that transmit and receive wireless signals with the UE 110. The vRAN 100 may include a virtual distributed unit (vDU) 130 that performs processing, for example, at the physical (PHY) layer, media access control (MAC) layer, and radio link control (RLC) layer. The vRAN 100 may include a virtual central unit (vCU) 140 that performs processing at higher layers of the wireless protocol stack. The vRAN 100 may include a RAN intelligent control (RIC) that performs autonomous configuration and optimization of the vRAN 100.

The division of functionality between the vDU 130 and the vCU 140 may depend on a functional split architecture. The vCU 140 may be divided into a central unit control plane (CU-CP) and central unit user plane (CU-UP). CU-UP may include the packet data convergence protocol (PDCP) layer and the service data adaptation (SDAP) layer, and the radio resource control (RRC) layer. Different components or layers may have different latency and throughput requirements. For example, the PHY layer may have latency requirements between 125 µs and 1 ms and a throughput requirement greater than 1 Gbps, the MAC and RLC layers may have latency requirements between 125 µs and 1 ms and a throughput requirement greater than 100 Mbps, and the higher layers at the vCU may have latency requirements greater than 125 µs and a throughput requirement greater than 100 Mbps.

Programmability in Open RAN components may be facilitated through a near real-time RIC 150. A network operator can install applications (Apps 152, e.g., xApps in Open RAN) on top of the RIC 150, which may collect detailed telemetry and may leverage the telemetry to optimize network performance or report issues in near real-time (e.g., >10 ms to seconds). The data collection and control of the vRAN components may be facilitated through service models that must be embedded in the vRAN functions by vendors. The service models may explicitly define the type and frequency of data reporting for each App 152, as well as a list of control policies that the RIC can use to modify the RAN behavior. Each App 152 may specify its own service model, requiring the collection of different telemetry data.

The initial xApps proposed for standardization by Open RAN focus on optimizing handovers, self-organizing network (SON) functionality, anomaly detection, and coarse grained radio resource allocation. In these use cases, significant network events occur at a low rate (100s of ms to seconds). The volume of generated telemetry data is low, and all the data are transported to the RIC. This allows Apps 152 to have a full insight into the domain and tune the vRAN functions through a pre-determined set of control policies.

Unfortunately, this approach does not scale to many other use cases of RAN monitoring and control for two main reasons.

Firstly, for many lower layer applications (e.g., PHY and MAC), it is inefficient to transport all the data to the RIC due to its sheer volume (as shown in FIG. 1). For example, applications like localization, channel estimation, interference detection, and beamforming may require uplink IQ samples from the physical layer. Transporting all IQ samples to the RIC requires more than 5 Gbps per cell for 100 MHz 4×4 MIMO. The standard RIC design overcomes this problem by specifying in the service model of each App the data required in terms of type and frequency (e.g., in a raw or a pre-processed format). The form of pre-processing (e.g., sub-sampling, averages, or subsets of data) greatly depends on the service model, posing a serious limitation to interoperability because vRAN vendors must implement and support each proprietary service model.

Secondly, many real-time control loops (e.g., packet scheduling and power control), have very tight time constraints (<10 ms). Such time constraints cannot be met by the standard RIC design that has an expected latency in the order of hundreds of milliseconds. As in the case of telemetry, the App choice of control policy is limited by a set of (standardized) policies that the appropriate service model of the RIC provides. vRAN vendors must implement and integrate such algorithms in their stack, while ensuring that they do not affect the run time performance of the vRAN component. This framework of services models implanted by the vRAN vendor makes it very difficult to practically implement new custom variants of tight control loops.

Figure 2:
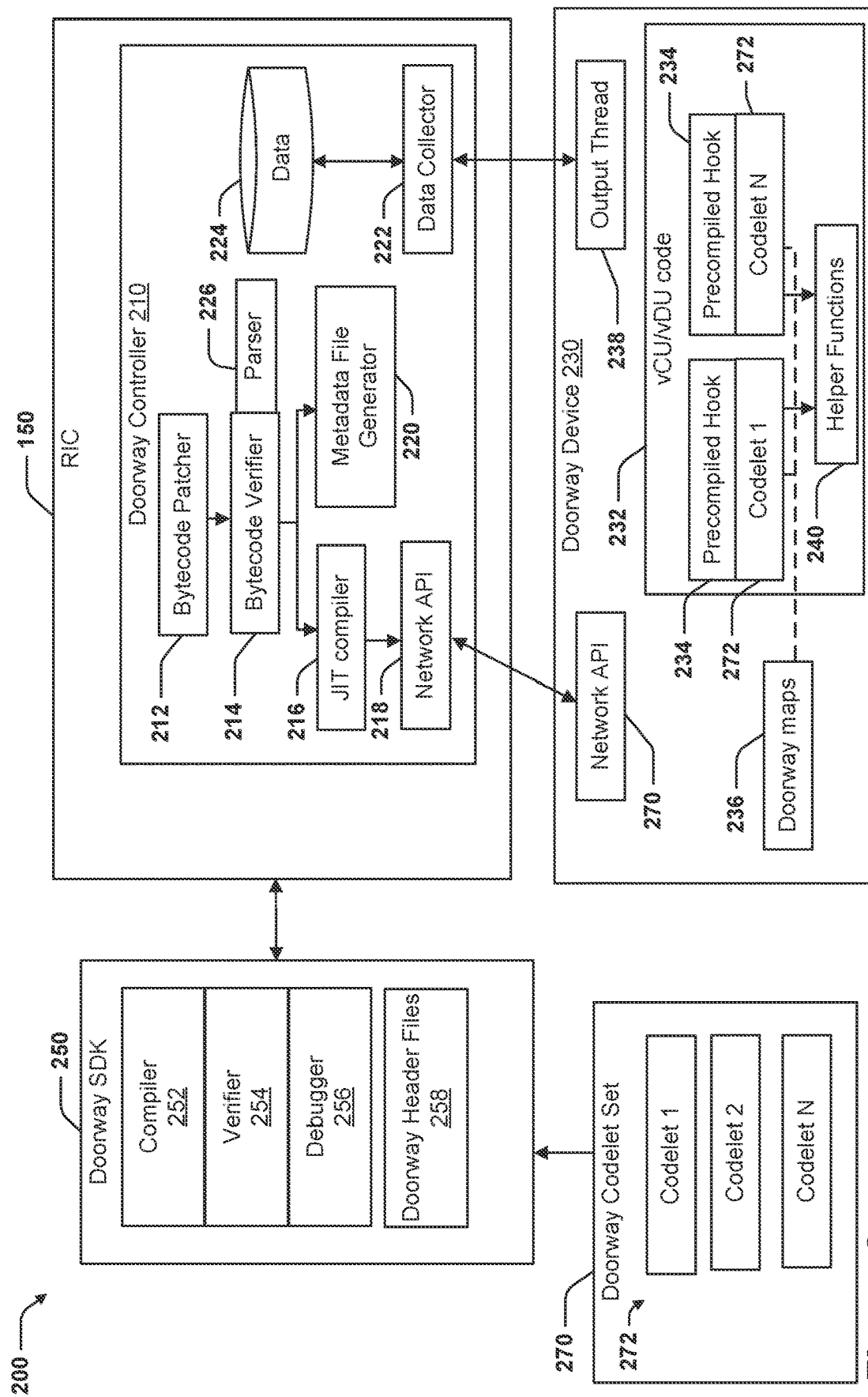
FIG. 2 is a diagram of an example doorway system that provides a code execution framework that allows the safe dynamic loading of custom code including machine-learning models in a sandboxed environment.

FIG. 2 is a diagram of an example doorway system 200 that provides a code execution framework that allows the safe dynamic loading of custom code in a sandboxed environment at different places in the vRAN. The doorway system may include a doorway controller 210 that may be implemented at the RIC 150 and a doorway device 230 that may be implemented at a network node such as the vDU 130 or vCU 140.

A doorway device 230 may be any application 232 such as a vRAN component (e.g., a vCU or vDU process) that allows execution of custom code. The doorway system 200 may execute the custom code inside a user mode version of eBPF, called uBPF. An application 232 such as a vRAN component is modified to introduce doorway call points, or hook points 234, at selected places in vRAN functions, at which an eBPF virtual machine (VM) with custom code can be invoked. The invocation is inlined with the vRAN code and gives the VM read-only access to a selected internal vRAN context, which includes, for example, various 3GPP-defined data structure. Table 1, below, provides example hook points in a vRAN.

TABLE 1

| Hook point | vRAN function(s) | Context description |
| --- | --- | --- |
| Raw UL IQ samples | vDU | Capture uplink IQ samples sent by RU to vDU through xRAN 7.2 interface |
| FAPI interface | vDU | Capture scheduling and data plane packets exchanged between MAC and PHY layers |
| RLC | vDU | Capture information about buffers of mobile devices and RLC mode/parameters |

TABLE 1-continued

| Hook point | vRAN function(s) | Context description |
|---|---|---|
| F1/E1/Ng/Xn interfaces | vCU/vDU | Capture control/data-plane messages exchanged between 3GPP interfaces of vCU/vDU/5G core |
| RRC | vCU | Capture RRC messages exchanged between mobile devices and the base station |

A codelet 272 including custom code can be loaded and unloaded dynamically from a hook point 234 of a doorway device 230, at runtime. In some implementations, the codelet 272 may not affect the performance of the doorway device 230 with respect to performing the vRAN function. For instance, the codelet 272 may merely collect data. In other implementations, the codelet 272 may control the vRAN function (e.g., make scheduling decisions).

A doorway codelet 272 is custom code that can be deployed at a single hook point 234 on a doorway device 230 at runtime. Developers can write codelets 272 in programming languages such as C and compile the codelets into eBPF bytecode using an eBPF compiler 252. Similar to any eBPF program, a doorway codelet 272 must be written in a way that allows the codelet 272 to be statically verifiable (e.g., the code must introduce memory checks and can only have bounded loops). Any operations required by the codelet 272 that could be potentially unsafe (e.g., accessing memory outside of the region the codelet is allowed to access) can only be performed through a set of white-listed helper functions 240 that are deemed safe by the framework. A codelet 272 does not keep any state between two invocations. All state must be stored in an external location called a map 236. For example, a codelet 272 may send its telemetry data through a special map 236 to a doorway output thread 238 running at the doorway device 230, which forwards the telemetry data to the doorway controller 210. In some implementations, the codelet 272 calls a protobuf encoder to write to the special map 236. For each output stream (map of type JANUS_MAP_TYPE_RINGBUF), a single-producer/single-consumer lock-free ring buffer is created to push data out from the codelet to the output thread 238. This ensures that the codelet will never be pre-empted and might only drop excess packets at worst.

A codeletset 270 may refer to an ensemble of coordinated codelets that operate across multiple doorway hook points of a doorway device. Different codelets 272 in a codeletset 270 can coordinate with very low latency through shared maps 236. Codelets across devices can coordinate through the doorway controller 210 if needed.

The doorway controller 210 is responsible for controlling the doorway devices 230 and codeletsets 270. In the context of O-RAN, the doorway controller 210 can be implemented as an App 152 on a RIC 150. Developers may upload codeletsets 270 to the controller 210, with instructions for them to be loaded/unloaded to one or more doorway devices 230. For example, the instructions may be provided to a container orchestration system as described below with respect to FIG. 3. The controller 210 includes a bytecode verifier 214 that verifies safety and termination of each codelet before the controller 210 allows a codeletset 270 to be loaded. For this purpose, an eBPF verifier (such the open-source PREVAIL eBPF verifier) may be extended with verification for doorway helper functions and output schemas. In some implementations, the verifier 214 may include a parser 226 that verifies that a serial representation of a ML model is parseable according to a type of the ML model. The controller 210 includes a bytecode patcher 212 configured to further modify (or patch) the bytecode of uploaded codelets with additional control code that pre-empts the codelets if the runtime of the codelet exceeds some threshold. The controller 210 includes a just-in-time (JIT) compiler 216 that compiles the patched codelets. The controller 210 includes a network API 218 configured to push the compiled codelets to the doorway devices 230 over the network. The controller 210 may also include a metadata file generator 220 configured to provide meta-data files required for enabling the flexible output of data using protobuf output schemas. The controller 210 may also provide a data collector 222, which collects and deserializer the data 224 sent from the doorway codelets.

The doorway system may also provide a doorway SDK 250 that allows developers to locally test doorway codelets early in the development cycle. The SDK 250 includes a compiler 252, a verifier 254, and a debugger 256, as well as header files 258 including the definitions of all the helper functions and map types that are supported by doorway devices 230.

Doorway codeletsets 270 are JIT-compiled and loaded to doorway devices 230 through the network API 218 provided by the doorway controller 210. Developers can upload the developed codeletsets 270 to the doorway controller 210 and load codeletsets 270 to doorway devices 230 using a tool provided by the doorway SDK 250. The instructions required to upload a codeletset 270 to the doorway controller 210 and load the codeletset 270 to the doorway device 230 are encoded in a descriptor file written in yet-another-markup-language (YAML) format.

At the minimum, the YAML file specifies the names of all the codelets that are part of the codeletset (eBPF byte-code object files in ELF format), the name of the hook in the doorway devices 230 the codelets should be linked to and a calling priority of the codelets. Multiple codelets can be linked to the same hook. The YAML file provides additional optional configuration parameters for further configuring codelets such as, for example, the runtime threshold.

Codelets 272 of the same codeletset 270 can share state and coordinate. This sharing can be particularly useful when performing monitoring or control operations that require the correlation of events and data across different layers of the vRAN stack (e.g., as in the case of interference detection). The sharing of state between codelets of a codeletset is performed using shared maps 236. For this mechanism to work, codelets that want to share state must use the exact same definition for the shared map 236 in terms of its type, key_size, value_size and max_entries, while the name of the map can be different. Developers can then specify the maps to be linked, in the linked_maps section of the YAML descriptor file they use for loading the codeletset 270. When the codeletset 270 is loaded, memory for the shared map 236 is only allocated once on the doorway device 230 and all codelets 272 sharing the map 236 get a pointer to the same memory, which the codelets 272 can then call through helper functions 240 to store and load state.

FIG. 3 illustrates an example architecture 300 for loading codelets in a container orchestration system 302. For example, the container orchestration system 302 may be a Kubernetes system that executes applications within containers that are grouped into workload pods. In some implementations, the applications may be vRAN functions and a doorway device 230 may be implemented in a container. The architecture 300 includes a container API server 310, a mutating webhook 320, a controller 330, a node agent 340, and a workload pod 370.

The container API server 310 may interact with a user 312 for configuring containers for execution. For example, the user 312 may provide a configuration for a container image. In some implementations, the configuration may be a yet-another-markup-language (YAML) file or JavaScript Object Notation (JSON) file specifying container properties and resources. The configuration may include a header indicating dynamic loading of codelets. The container API server 310 may control the controller 330 and node agent 340 to instantiate a main container 380 within a workload pod 370 and provide resources for the container.

The mutating webhook 320 may include computer-executable code for modifying the user configuration of a container image. For example, the mutating webhook 320 may modify the user configuration to add capabilities for the main container 380 to dynamically load codelets. For instance, the mutating webhook 320 may add a sidecar container 372 to run alongside the main container 380 for the container image (e.g., within the workload pod 370). The mutating webhook 320 may mount one or more libraries 382 into the main container 380. The libraries 382 may define functions associated with hook points 392 within the application 390. The mutating webhook 320 may modify an entry point for the main container to run a script that loads the one or more libraries 382. For example, the script and libraries 382 may be defined by common scripts and libraries 350. The mutating webhook 320 may mount a directory 386 for compiled and verified codelets into the main container.

The node agent 340 may include computer-executable code for dynamically loading codelets into the main container 380. The codelets may be dynamically defined by the user 312 via a config map for a codelet. The container API server 310 may receive the config map while the application 390 is executing in the main container 380. The node agent 340 may monitor the API server 310 for the config map. The node agent 340 may compile and verify the codelet to generate a compiled and verified codelet 360. The node agent 340 may load the compiled and verified codelets 360 into the codelet directory 386.

The controller 330 may include computer-executable code for controlling workload pods 370 and containers including main containers 380 and sidecar containers 372. The controller 330 may receive annotations to the user configuration of a container via the container API server 310. The annotations may associate a codelet with a hook point 392 of the application 390. The controller 330 may provide the annotations to the sidecar container 372. The sidecar container 372 may be configured to symbolically link the codelet indicated by annotation to a hook point 392 within the application 390. For example, the sidecar container 372 may symbolically link the codelet to the function in the library 382 associated with the hook point. Once a compiled and verified codelet 360 that is stored in the codelet directory 386 is symbolically linked to a hook point, the codelet may be considered a mapped codelet 384. When execution of the application 390 reaches a hook point and calls the function in the library 382, the mapped codelet 384 may be executed via the symbolic link. Accordingly, the codelet may be dynamically loaded and executed within the application 390 during execution.

In another implementation, codelets may be dynamically loaded to hook points 234 using a user space implementation of a Read-Copy-Update mechanism (RCU). RCU allows multiple uncoordinated readers to access a shared data structure at the expense of longer write/update times. For example, the readers may be the fast vRAN threads that execute codelets, and the writer is the (non real-time) thread that updates the hook codelet list.

FIG. 4 illustrates an example code listing 400 for a codelet 410 that may be executed in a vRAN using the system 200. In the example code listing, the system 200 and components thereof may be referred to as janus. The doorway system 200 and/or architecture 300 enable new monitoring and control capabilities. The example code listing 400 refers to a codelet developed for the vDU of OAI, which is an open-source implementation of a 4G and 5G vRAN stack. At a high level, the example codelet 410 is invoked by a hook that is introduced at the functional API (FAPI) interface, which is used for the communication of the PHY and MAC layers of the vDU. FAPI packets are C structures, containing information used for the scheduling of radio resources to mobile devices. In the example codelet, a counter maintaining the number of captured FAPI events is sent to the data collector 222 after every 1000 events. While simple, this codelet captures important features that demonstrate the power of the doorway system over the conventional RIC design.

The state argument in line 22 of FIG. 4 is the context (of type janus_ran_fapi_ctx, lines 28-29) that is passed to the function by the vRAN through the hook point 234. The state argument contains a pointer to a FAPI DL Config Request message of type nfapi_dl_config_request_pdu_t, lines 31-32). This message describes a complete scheduling allocation for a particular downlink slot, comprised of more than 20 fields per mobile user, including modulation and coding scheme, transport block size, allocated resource blocks, MIMO layers, etc. The verifier 24 ensures read-only access to the context information to enable safe zero-copy access to an internal vRAN context. Due to the modular vRAN design, there is a small number of similar interfaces specified in different standards (3GPP, Small cell forum) that carry all relevant state across vRAN components. By adding hook points at these interfaces, the doorway controller can give doorway codelet developers access to a large trove of vRAN telemetry. The identified hooks in Table 1 have been implemented. The hooks in Table 1 hooks can be used to enable multiple RIC applications without modifying a single line of code inside the vRAN functions other than addition of the hook points. In some cases, the implementation of an interface may differ across vRAN vendors (e.g., in terms of C struct memory layout). Due to the flexibility of the doorway system, small changes to codelets can be used to adjust to the observed differences while maintaining the same codelet functionality.

Doorway codelets rely on shared memory regions known as maps 236 in eBPF to store state across consecutive invocations, as well as to exchange state with other codelets 272 of the same codeletset 270. The doorway system provides various map types for storing data, including arrays, hashmaps and Bloom Filters. As an example, for the codelet of FIG. 4, the codelet maintains a counter of observed FAPI packets to export to the RIC, instead of exporting the whole raw captured packet. This counter is achieved, by defining an array map (lines 6-11), containing a single element (max_entries). Each time one or more FAPI packets are received, the counter can be restored from memory through a helper function (line 37), incremented with the new number of packets (line 39) and saved again using a helper function (line 45), to be used in the next invocation of the codelet 410. Various safety checks are required to enable static verification (e.g., lines 34 and 38). Furthermore, maps 236 can be shared between codelets 272 in a codeletset 270 to coordinate actions.

In a similar way, doorway codelets can send arbitrary telemetry data to the data collector 222 using flexible output schemas through a special type of ringbuffer map (JANUS_MAP_TYPE_RINGBUF). This map 236 is linked to a codelet-specific protobuf schema defined by the codelet developer. In the example of listing 400, the definition of the output map can be seen in lines 13-19 for a custom output protobuf schema called output_msg (line 26), with a single counter field (line 41). The data can be exported to the data collector 222 through another helper function 240 (line 42). This flexibility allows implementation of the data models currently available in the O-RAN RIC specs without modifying a single line of code in the vCU 140 and vDU 130, after the hook points 234 are in place.

Verification ensures that a doorway codelet 272 cannot directly modify the state of the vRAN. Instead, modification of the vRAN behavior requires control helper functions 240, provided by the vRAN vendors. The helper functions 240 may be associated with specific hook points 234. The verifier 214 may verify that calls to helper functions are allowed for the associated hook point 234. For example, a vendor may allow a codelet to control scheduling by providing a helper function called allocate_resource_blocks( ) that can only be called at a MAC hook used for radio resource allocation. Similar helper functions can be added for other operations (e.g., handovers, flow prioritization). Although the control helper functions are more dependent on the internal vRAN software architecture, they provide a way for a developer to customize vRAN behavior at runtime.

The doorway system 200 may provide several example classes of applications for various vRAN use cases. In a first example, the doorway system 200 may provide flexible monitoring of a vRAN. As discussed above, the O-RAN RIC 150 allows the collection of telemetry data used for network optimizations through the specification of service models. Each model undergoes a lengthy process of standardization, and subsequently needs to be implemented by each RAN vendor that decides to support it. The doorway system 200 may be used to implement more flexible monitoring without reliance on service models. The doorway system 200 can be used to implement codelets that extract key performance indicators (KPIs) specified in the key performance measurement (KPM) model of O-RAN as well as raw scheduling data. The implementation and collection of these KPIs may be implemented in the system 200 without having to change a single line of code in the vRAN functions that include hook points. Accordingly new data model can be implemented by a developer without a need for further vendor modification of the vRAN function or standardization between vendors. For example, the system 200 can collect the downlink total Physical Resource Block (PRB) usage KPI by tapping into the FAPI hook of Table 1 and capturing the nfapi_dl_config_request_pdu_t struct that was described in listing 400 and which contains the number of PRBs allocated to each user at each scheduling decision. The contents of this struct can be stored in a doorway map 236, averaged over a period of 0.5 ms and sent out to the data collector 222 by a codelet 272.

Another example use case for the system 200 is external interference detection. Detecting external interferers in a cellular network (e.g., repeaters with improperly adjusted gains, spurious emissions of electronics devices, or jammers) is a hard problem that conventionally involves dispatching experts and specialized hardware into the field. A doorway codeletset 270 can define a spectrum analyzer to detect external interference through already deployed and operational 5G radio units (e.g., RUs 120), without a need for a dispatch. The codeletset 270 may include two codelets 272 that use maps for coordination. The first codelet (installed at the FAPI hook of Table 1) detects idle slots when there are no 5G transmissions. The second codelet (installed at the IQ samples hook of Table 1) samples interference during the detected idle slots. The flexibility of the doorway system allows adjustment of the fidelity and overhead of the spectrum analyzer as needed, by specifying a number of parameters in terms of which antenna ports and symbols to collect IQ samples from, with what frequency (e.g., every reception slot or every 10 ms) and with what granularity (e.g., raw IQ samples vs average energy per resource block). A similar approach can be used to implement other use cases that require radio channel telemetry data in a different format (e.g., wireless localization and wireless channel estimation.

Another example use case for the system 200 is network slicing. Many verticals and enterprise applications may rely on network slicing for stricter service QoS guarantees. For example, a robotic warehouse may need very accurate tail communication latency. Existing solutions based on O-RAN service models allow for a set of pre-defined slice scheduling policies that control scheduling at a granularity of 10s of milliseconds. The doorway system 200 may provide real-time slices of arbitrary scheduling policies with a granularity of 0.5-10 ms, faster than the capabilities of standard RIC models. The doorway system 200 can introduce a control hook (slice_scheduler( )) in the beginning of the MAC downlink scheduling function of the vDU 130, which is responsible for the allocation of radio resources to UEs 110. The MAC downlink scheduling function can pass the structure that is used by the MAC scheduler as a hook context. The structure contains the scheduling state of the base station (e.g., number of devices, the slice they belong to, buffer sizes, signal quality, etc.). A helper function 240 (allocate_resource_blocks ( )), which is specific to the slice_scheduler ( ) hook, may be configured to allow a codelet to modify the allocation of radio resources per slice. Using this hook, a codelet 272 may implement a network slicing scheduler that may be dynamically loaded.

Another example use case for the doorway system 200 is real-time machine-learning prediction. Real-time parameter prediction has been proposed for RAN control loops because the prediction freshness has a direct impact on the network performance. Due to the O-RAN RIC latency, conventional Apps 152 provide predictions that are 10s of milliseconds old. Using the doorway system 200, ML predictor codelets can achieve prediction latency under 10 ms. A first example ML predictor is an autoregressive integrated moving average (ARIMA) time-series model for the prediction of user signal quality. A second example ML predictor is a quantile decision tree for the prediction of signal processing task runtimes. More complex models, such as a Random Forest are more difficult to implement in a doorway codelet using C code, as such complex models result in a large number of bytecode instructions (>100K) making the verification process slow (>20 minutes) and the codelet possibly non-verifiable.

In an aspect, the doorway system 200 can support complex ML models in the form of a map 236. A pre-trained serialized complex model can be passed to the doorway system 200 as a map and linked to the defined map during codelet loading. The doorway system 200 may parse the serialized model and reconstruct the model in memory. The model can then be accessed by the codelet for inference using a helper function 240 (e.g., janus_model_predict( )).

This approach can be extended to other commonly used ML models (e.g., Long Short Term Memory (LSTM) networks).

FIG. 5 is a diagram 500 of a doorway device 230 configured with codelets to use ML models for inference. A first codelet 272a may include an ML model 510 within the code of the codelet 272a. A second codelet 272n may include a map 520 that defines an ML model 530.

The ML model 510 may be a relatively simple ML model that can be defined in verifiable code within the codelet 272a. For example, the code may define weighting factors applied to decisions based on a pre-trained model. The codelet 272a including the ML model 510 may be verified by the verifier 214 (FIG. 2). The codelet 272a may be loaded to a hook point 234 and executed within the application 232.

The ML model 530 may be a relatively complex ML model. For example, code for the ML model 530 may not be verifiable by the verifier 214 or the verification may take longer than a threshold time. In order to allow such complex ML models for inference by a codelet, the doorway device 230 may support various ML model types 540 as maps 236. The ML model types 540 may be well known types of ML models with known serial representations. For example, the ML model types 540 may include two or more of a random forest model, a long short-term memory (LSTM) model, a convolutional neural network (CNN), or a recurrent neural network (RNN) model. Because the ML model types 540 are supported by the doorway system 200, the doorway system 200 can verify that code provided by the doorway system 200 is safe. The codelet 272n may include the map 520 that defines the ML model 530 according to an ML model type 540. The map 520 may include a serial representation of the ML model 530 that is parseable according to the ML model type 540. The codelet 272n may also include a call 522 to a helper function 524 that accesses the ML model 530. The verifier 214 may verify the codelet 272n by verifying that the map 520 is properly defined and does not violate memory access restrictions. The verifier 214 may also verify that the call 522 to the helper function 524 is allowed. In some implementations, the verifier 214 may use the parser 226 to check that the map 520 is parseable according to one of the support ML model types 540.

When the codelet 272n is loaded to a hook point 234, the map 520 is passed to the doorway maps 236. The doorway device 230 includes a parser 550 that is similar to the parser 226 and also configured to reconstruct the ML model 530 from the serial representation in the map 520 within memory allocated to the application 232. When the codelet 272n is executed, the call 522 to the helper function 524 passes model features to the ML model 530, which returns a result to the codelet 272n. The codelet 272n may use the result for various purposes such as making a decision to control the application 232 (e.g., based on a predicted value) or storing the result for access outside of the application (e.g., analytics). In some implementations, the ML model 530 may persist in the memory allocated to the application 232 for multiple calls from the codelet 272n. The ML model 530 may store state information between calls.

Figure 6:
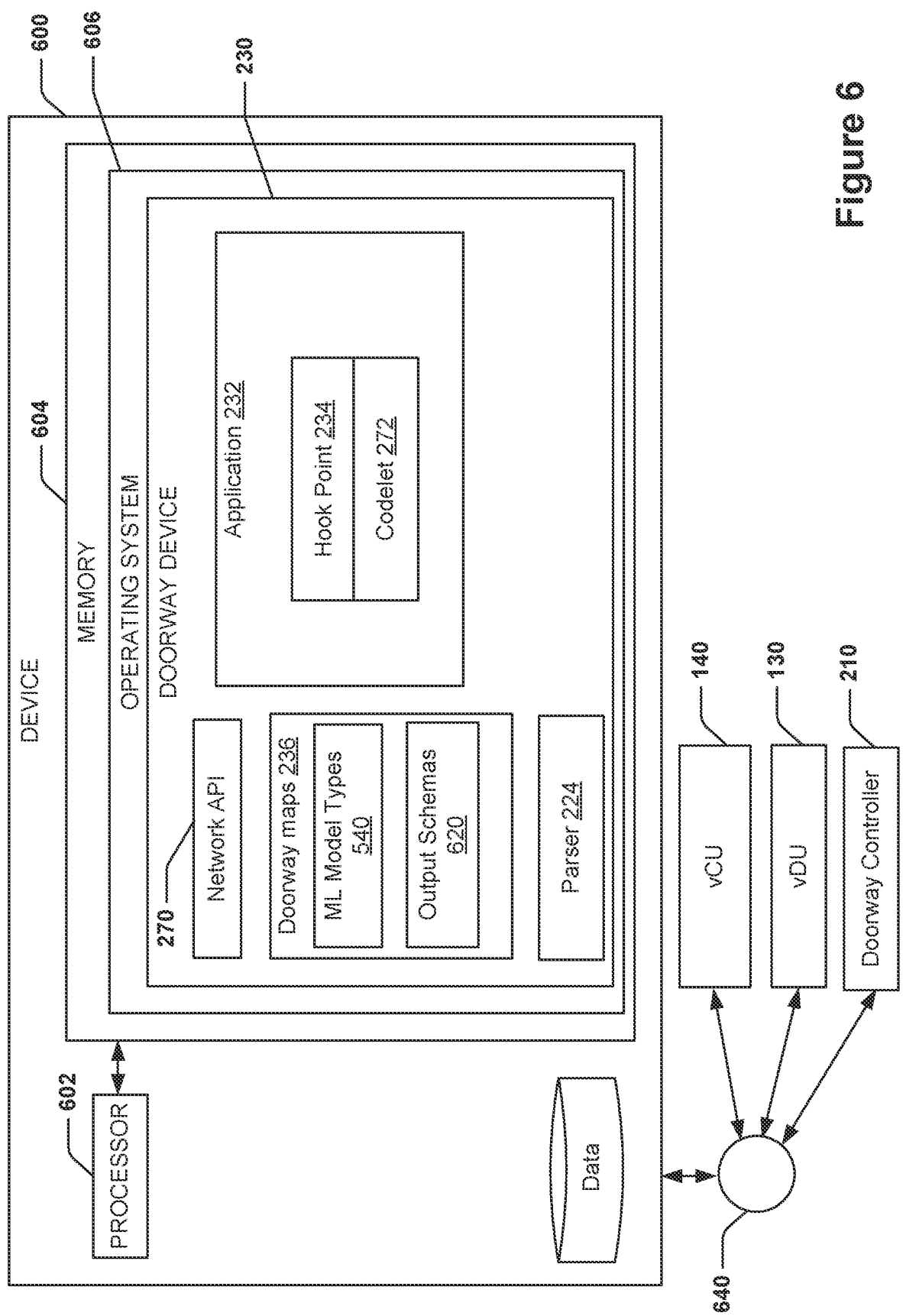
FIG. 6 is a schematic diagram of an example of an apparatus for implementing a doorway device.

FIG. 6 is a schematic diagram of an example of an apparatus (e.g., a computing device 600) for implementing a doorway device 230. The device 600 may be an example of a vRAN component such as a vDU 130 or vCU 140. The device 600 may reside within a data center, which may be an edge data center. The device 600 may be connected to other servers within the data center via the switch 640 and wired connections. For example, device 600 may be connected to doorway controller 210 or another vRAN component such as a vCU 140 or vDU 130.

In an example, device 600 can include at least one processor 602 and/or memory 604 configured to execute or store instructions or other parameters related to providing an operating system 606, which can execute one or more applications or processes, such as, but not limited to, the doorway device 230 and an application 232. For example, processor 602 and memory 604 may be separate components communicatively coupled by a bus (e.g., on a motherboard or other portion of a computing device, on an integrated circuit, such as a system on a chip (SoC), etc.), components integrated within one another (e.g., processor 602 can include the memory 604 as an on-board component), and/or the like. Memory 604 may store instructions, parameters, data structures, etc. for use/execution by processor 602 to perform functions described herein.

In an example, the doorway device 230 may include one or more of an application 232, doorway maps 236, and the parser 550. The application 232 may include one or more hook points 234 and one or more codelets 272 loaded to a respective hook point 234. The doorway maps 236 may include a map for a supported ML model type 540. In some implementations, the doorway maps 236 may include an output schema.

FIG. 7 is a flow diagram of an example of a method 700 for executing codelets including ML models within an application. For example, the method 700 can be performed by a device 600 and/or one or more components thereof to use an ML model for inference within the application.

At block 710, the method 700 includes verifying, based on compiled eBPF bytecode of a codelet, that the codelet satisfies safety requirements for execution within the application. In an example, the bytecode verifier 214, e.g., in conjunction with processor 602, memory 604, and operating system 606, can verify, based on compiled eBPF bytecode of a codelet 272, that the codelet 272 satisfies safety requirements for execution within the application 232. In some implementations, at sub-block 712, the block 710 may optionally include determining that the serial representation of the machine-learning model is parseable according to the type. For example, the parser 226 at the doorway controller 210 may determine that a serial representation of the ML model 530 within the map 520 is parseable according to an ML model type 540.

At block 720, the method 700 includes loading the verified codelet into a hook point of the application. In an example, the network API 218, e.g., in conjunction with processor 602, memory 604, and operating system 606, can load the third-party codelet 272 to a hook point 234 of an application 232. In some implementations, where the application is executed in a container orchestration system, the block 720 may include the method 800 discussed below. In some implementations, the sub-block 712 may be performed by the parser 550 at the doorway device 230 during the block 720. In some implementations, at sub-block 722, the block 720 may optionally include reconstructing the machine-learning model within memory allocated to the application based on the serial representation of the machine-learning model. For instance, the parser 550 at the doorway device 230 may reconstruct the ML model 530 within the memory 604 allocated to the application 232 based on the serial representation (e.g., map 520) of the ML model 530.

At block 730, the method 700 includes executing the verified codelet to apply application data to the machine-learning model to infer a result. In an example, the doorway device 230, e.g., in conjunction with processor 602, memory 604, and operating system 606, can execute the verified codelet 272 to apply application data to the machine-learning model 510, 530 to infer a result.

At block 740, the method 700 may optionally making a decision based on the result. In an example, the doorway device 230 executing the application 232, e.g., in conjunction with processor 602, memory 604, and operating system 606, can make a decision based on the result. For example, in the vRAN use cases, the result may be a predicted measurement. A vDU 130 may, for example, make scheduling decisions based on a predicted measurement from the ML model 510, 530.

At block 750, the method 700 may optionally include storing the result for access outside of the application. In an example, the doorway device 230 executing the codelet 272, e.g., in conjunction with processor 602, memory 604, and operating system 606, can store the result for access outside of the application. For instance, the codelet 272 may store the result in an output schema 620, which may be exported to the doorway controller 210 via the output thread 238. For instance, in the vRAN use cases, an ML model 510, 530 may infer a network status, which the RIC 150 may be useful for the RIC 150 in making optimization decisions.

FIG. 8 is a flow diagram of an example of a method 800 for loading codelets into an application executing in a container. For example, the method 800 can be performed by a device 600 and/or one or more components thereof to load the codeletset 270 or codelets 272 into the application 232. In some implementations, the method 800 may be used to load codelets into any application executing on a container orchestration system. The method 800 may be performed in conjunction with the method 700. For example, the method 800 may correspond to the block 720.

At block 810, the method 800 optionally includes modifying the application to include a plurality of hook points. In an example, the doorway controller 210 or the container API server 310, e.g., in conjunction with processor 602, memory 604, and operating system 606, can modify the application 390 to include a plurality of hook points 392.

At block 820, the method 800 includes receiving a user configuration of a container image for the application, the user configuration including a header indicating dynamic loading of codelets. In an example, the container API server 310, e.g., in conjunction with processor 602, memory 604, and operating system 606, receive a user configuration of a container image (e.g., a YAML file) for the application 390, the user configuration including a header indicating dynamic loading of codelets.

At block 830, the method 800 includes receiving a map for a codelet while the application is executing in a main container. In an example, the container API server 310, e.g., in conjunction with processor 602, memory 604, and operating system 606, can receive a map for a codelet while the application is executing in a main container 380.

At block 840, the method 800 includes mounting code including a function associated with a hook point of the application to the container. In an example, the mutating webhook 320, e.g., in conjunction with processor 602, memory 604, and operating system 606, can mount code including a function (e.g., library 382) associated with a hook point 392 of the application 390 to the container 380.

At block 850, the method 800 includes mounting code including a function associated with a hook point of the application to the container. In an example, the mutating webhook 320, e.g., in conjunction with processor 602, memory 604, and operating system 606, can mount code including a function (e.g., library 382) associated with a hook point 392 of the application 390 to the container 380.

For example, at sub-block 842 the mutating webhook 320 may modify an entry point of the container 380 to execute a script to dynamically load the library 382 which is capable of executing the codelet at the hook point 392.

At block 860, the method 800 includes making a location available to the container that contains compiled and verified codelets. In an example, the mutating webhook 320, e.g., in conjunction with processor 602, memory 604, and operating system 606, can make a location (e.g., codelet directory 386) that contains compiled and verified codelets 360 available to the container 380.

At block 870, the method 800 includes detecting an annotation for the container that identifies the third-party codelet during execution of the application. In an example, the controller 330, e.g., in conjunction with processor 602, memory 604, and operating system 606, can detect an annotation for the container that identifies the third-party codelet during execution of the application.

At block 880, the method 800 includes symbolically linking the third-party codelet indicated by the annotation to the hook point of the application. In an example, the sidecar container 372, e.g., in conjunction with processor 602, memory 604, and operating system 606, can symbolically link the third-party codelet indicated by the annotation to the hook point 392 of the application 390.

Figure 9:
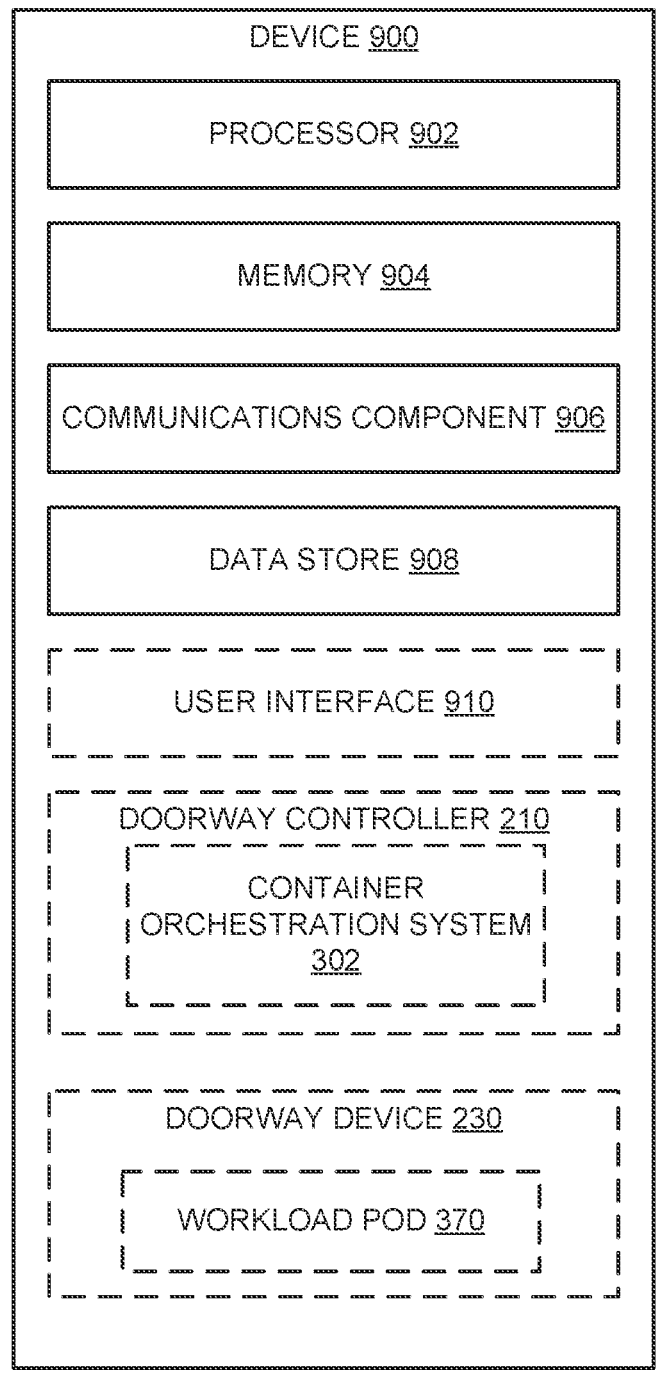
FIG. 9 illustrates an example of a device including additional optional component details as those shown in FIG. 6.

FIG. 9 illustrates an example of a device 900 including additional optional component details as those shown in FIG. 6. In one aspect, device 900 may include processor 902, which may be similar to processor 602 for carrying out processing functions associated with one or more of components and functions described herein. Processor 902 can include a single or multiple set of processors or multi-core processors. Moreover, processor 902 can be implemented as an integrated processing system and/or a distributed processing system.

Device 900 may further include memory 904, which may be similar to memory 604 such as for storing local versions of operating systems (or components thereof) and/or applications being executed by processor 902, such as doorway controller 210, doorway device 230, etc. Memory 904 can include a type of memory usable by a computer, such as random access memory (RAM), read only memory (ROM), tapes, magnetic discs, optical discs, volatile memory, non-volatile memory, and any combination thereof.

Further, device 900 may include a communications component 906 that provides for establishing and maintaining communications with one or more other devices, parties, entities, etc. utilizing hardware, software, and services as described herein. Communications component 906 may carry communications between components on device 900, as well as between device 900 and external devices, such as devices located across a communications network and/or devices serially or locally connected to device 900. For example, communications component 906 may include one or more buses, and may further include transmit chain components and receive chain components associated with a wireless or wired transmitter and receiver, respectively, operable for interfacing with external devices.

Additionally, device 900 may include a data store 908, which can be any suitable combination of hardware and/or software, that provides for mass storage of information, databases, and programs employed in connection with aspects described herein. For example, data store 908 may be or may include a data repository for operating systems (or components thereof), applications, related parameters, etc. not currently being executed by processor 902. In addition, data store 908 may be a data repository for doorway controller 210, doorway device 230, and/or one or more other components of the device 900.

Device 900 may optionally include a user interface component 910 operable to receive inputs from a user of device 900 and further operable to generate outputs for presentation to the user. User interface component 910 may include one or more input devices, including but not limited to a keyboard, a number pad, a mouse, a touch-sensitive display, a navigation key, a function key, a microphone, a voice recognition component, a gesture recognition component, a depth sensor, a gaze tracking sensor, a switch/button, any other mechanism capable of receiving an input from a user, or any combination thereof. Further, user interface component 910 may include one or more output devices, including but not limited to a display, a speaker, a haptic feedback mechanism, a printer, any other mechanism capable of presenting an output to a user, or any combination thereof.

Device 900 may additionally include the doorway controller 210 for providing for executing codelets within an application and the doorway device 230 for executing the codelets, as described herein. In some implementations, the doorway controller 210 may be implemented as a container orchestration system 302 and the doorway device 230 may be implemented a workload pod 370.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, one or more of the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the claim language. Reference to an element in the singular is not intended to mean "one and only one" unless specifically so stated, but rather "one or more." Unless specifically stated otherwise, the term "some" refers to one or more. Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of executing a machine-learning model within an application, comprising:
    verifying, based on extended Berkeley packet filter (eBPF) bytecode of a codelet configured to execute a machine-learning model, that the codelet and the machine-learning model satisfy safety requirements for execution within the application, wherein the codelet includes a call to a machine-learning model of a type corresponding to one of a plurality of machine-learning model types supported by a controller of the application and a map for a serial representation of the machine-learning model;
    loading the verified codelet into a hook point of the application, wherein loading the verified codelet comprises determining that the serial representation of the machine-learning model is parseable according to the type; and
    executing the verified codelet within the application to apply application data to the machine-learning model to infer a result.

2. The method of claim 1, wherein the codelet includes code implementing a pre-trained machine-learning model.

3. The method of claim 1, wherein the plurality of machine-learning model types supported by the controller includes two or more of: a random forest model, a long short-term memory (LSTM) model, a convolutional neural network (CNN), or a recurrent neural network (RNN) model.

4. The method of claim 1, wherein loading the verified codelet comprises reconstructing the machine-learning model within memory allocated to the application based on the serial representation of the machine-learning model.

5. The method of claim 1, wherein the call to the machine-learning model includes the map for the serial representation and a data structure including the application data as input parameters and returns the result.

6. The method of claim 1, further comprising, by the codelet, storing the result for access outside of the application.

7. The method of claim 1, further comprising, by the application, making a decision based on the result.

8. The method of claim 1, wherein the application is a virtualized radio access network (vRAN) function.

9. An apparatus for executing a machine-learning model within an application, comprising:
- a memory storing computer-executable instructions; and
- at least one processor configured to execute the instructions to:
  - receive a compiled and verified codelet, wherein extended Berkeley packet filter (eBPF) bytecode of the codelet configured to execute a machine-learning model has been verified to satisfy safety requirements for execution within the application, wherein the codelet includes a call to a machine-learning model of a type corresponding to one of a plurality of machine-learning model types supported by a controller of the application and a map for a serial representation of the machine-learning model;
  - determine that the serial representation of the machine-learning model is parseable according to the type;
  - load the verified codelet into a hook point of the application; and
  - execute the verified codelet within the application to apply application data to the machine-learning model to infer a result.

10. The apparatus of claim 9, wherein the codelet includes code implementing a pre-trained machine-learning model.

11. The apparatus of claim 9, wherein the plurality of machine-learning model types supported by the controller includes two or more of: a random forest model, a long short-term memory (LSTM) model, a convolutional neural network (CNN), or a recurrent neural network (RNN) model.

12. The apparatus of claim 9, wherein the at least one processor is configured to reconstruct the machine-learning model within memory allocated to the application based on the serial representation of the machine-learning model.

13. The apparatus of claim 9, wherein the call to the machine-learning model includes the map for the serial representation and a data structure including the application data as input parameters and returns the result.

14. The apparatus of claim 9, wherein the at least one processor executing the codelet is configured to store the result in an output schema map for access outside of the application.

15. The apparatus of claim 9, wherein the processor executing the application is configured to make a decision based on the result.

16. The apparatus of claim 9, wherein the application is a virtualized radio access network (vRAN) function.

* * * * *